(12) United States Patent
Volk

(10) Patent No.: US 12,325,123 B2
(45) Date of Patent: Jun. 10, 2025

(54) IMPACT-PROTECTION SAFETY DEVICE FOR A ROBOT

(71) Applicant: Schaeffler Technologies AG & Co. KG, Herzogenaurach (DE)

(72) Inventor: Wolfgang Volk, Frensdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/266,440

(22) PCT Filed: Dec. 8, 2021

(86) PCT No.: PCT/DE2021/100982
§ 371 (c)(1),
(2) Date: Jun. 9, 2023

(87) PCT Pub. No.: WO2022/122083
PCT Pub. Date: Jun. 16, 2022

(65) Prior Publication Data
US 2024/0025060 A1 Jan. 25, 2024

(30) Foreign Application Priority Data
Dec. 11, 2020 (DE) .......................... 102020133102.9

(51) Int. Cl.
*B25J 19/00* (2006.01)
*B25J 17/02* (2006.01)

(52) U.S. Cl.
CPC ....... *B25J 19/0091* (2013.01); *B25J 17/0208* (2013.01)

(58) Field of Classification Search
CPC .......................... B25J 17/0208; B25J 19/0091
See application file for complete search history.

(56) References Cited

U.S. PATENT DOCUMENTS

| 4,801,240 A * | 1/1989 | Hautau | ................ B25J 17/0208 901/45 |
| 4,904,514 A * | 2/1990 | Morrison | ............. B25J 19/0083 428/80 |
| 6,408,531 B1 | 6/2002 | Schimmels | |

(Continued)

FOREIGN PATENT DOCUMENTS

| CN | 101863035 B | 5/2012 |
| CN | 207701622 U | 8/2018 |

(Continued)

*Primary Examiner* — William C Joyce
(74) *Attorney, Agent, or Firm* — Volpe Koenig

(57) ABSTRACT

An impact-protection safety device for a robot comprises a first connection part, which is intended to be connected to a robot arm, and a second connection part, which is intended to be connected to an actuator, wherein the connection parts cooperate with one another by means of guides of a first and second type, and a plurality of spring elements in the form of compression springs are tensioned between the connection parts The different guides each comprise a plurality of pegs connected to the second connection part, wherein the pegs to be assigned to the guide of the first type each have a stop contour that acts in the pull-out direction and engages behind a contour of the first connection part, and the pegs to be assigned to the guide of the second type are each surrounded by one of the spring elements.

19 Claims, 1 Drawing Sheet

(56) References Cited

U.S. PATENT DOCUMENTS

| | | | |
|---|---|---|---|
| 2004/0128850 | A1 | 7/2004 | Joo |
| 2008/0271669 | A1* | 11/2008 | Butterworth ........... B25J 9/0012 |
| | | | 156/220 |
| 2020/0254628 | A1 | 8/2020 | Cambruzzi et al. |
| 2020/0324459 | A1* | 10/2020 | Barnes .................... B29C 64/20 |

FOREIGN PATENT DOCUMENTS

| | | | |
|---|---|---|---|
| CN | 208728046 U | | 4/2019 |
| CN | 211491630 U | | 9/2020 |
| CN | 211623350 U | * | 10/2020 |
| DE | 3605505 A1 | | 8/1986 |
| DE | 3611806 A1 | * | 10/1987 |
| DE | 102011109786 A1 | | 1/2014 |
| DE | 102015224641 A1 | | 6/2017 |
| DE | 102016106689 A1 | | 10/2017 |
| DE | 102017217882 A1 | | 4/2019 |
| DE | 212020000034 U1 | | 6/2020 |
| JP | 86029297 A | | 11/2016 |
| TW | M469159 U | | 1/2014 |

\* cited by examiner

IMPACT-PROTECTION SAFETY DEVICE FOR A ROBOT

CROSS-REFERENCE TO RELATED APPLICATIONS

This application is the U.S. National Phase of PCT Appln. No. PCT/DE2021/100982, filed Dec. 8, 2021, which claims the benefit of German Patent Appln. No. 102020133102.9, filed Dec. 11, 2020, the entire disclosures of which are incorporated by reference herein.

TECHNICAL FIELD

The disclosure relates to an impact-protection safety device for robots designed according to the preamble of claim 1.

BACKGROUND

A generic impact-protection safety device is known, for example, from DE 36 05 505 A1. The known safety device has a buffer or damping mechanism to be arranged between a swivel arm and a working arm of a robot. If an impact force acts on the working arm during operation of the robot, it is intended to be absorbed by the buffer mechanism, wherein a sensing switch, which is part of the safety device, gives a signal to immediately stop the operation of the robot.

A plate of the impact-protection safety device according to DE 36 05 505 A1 that is connected to the swivel arm of the robot is referred to as a "stationary plate". Compared to the so-called stationary plate, a movable plate, which is attached to the working arm of the robot and is also to be assigned to the impact-protection safety device, can be displaced to a limited extent. A conical guide part is screwed to the movable plate and engages in a guide hole located in the stationary plate. In the stationary plate there are also a plurality of through holes, in each of which a peg can be displaced. Each of these pegs is fixed to a piston located on the opposite side of the stationary plate to the movable plate. Each piston simultaneously contacts a depression in the surface of the movable plate. If the movable plate is displaced in the direction of the stationary plate, the pegs, which are not rigidly attached to the movable plate and thus also allow relative rotations between the two plates, push the piston away from the stationary plate. This movement of the piston is counteracted by compression springs, which directly load the piston. In addition, the piston can be loaded with compressed air in the effective direction of the springs.

DE 10 2015 224 641 A1 discloses a method for detecting a collision of a robot arm with an object. Within the scope of this method, a plurality of position sensors of the robot, an electronic control device and a number of drives are used.

A collision protection device for a robot described in DE 10 2017 217 882 A1 comprises, in principle comparable to the device described in DE 36 05 505 A1, a first main body designed for attachment to a drive part of the robot and a second main body designed for coupling to an end effector of the robot. In this case, the second main body is tensioned into a basic position with respect to the first main body by tensioning means.

An anti-collision protection device for a robot described in DE 21 2020 000 034 U1 comprises a mounting plate on which slide rails are located. Connecting rods, which are coupled to a hollow spring plate, are guided on the slide rails. A large number of shock absorbing springs are located in the hollow spring plate.

Another impact-protection safety device for robots is described in CN 211 491 630 U. This device also comprises a number of components which can move in relation to one another to a limited extent and which are tensioned by springs.

SUMMARY

An object of the disclosure is to provide an impact-protection safety device for robots which is further developed compared to the prior art mentioned and which is distinguished by a particularly compact, assembly-friendly and at the same time robust construction.

This object is achieved according to the disclosure by an impact-protection safety device suitable for use with a robot. The impact-protection safety device comprises a first connection part, which is intended to be connected to a robot arm, and a second connection part, which is intended to be connected to an actuator, wherein the two connection parts cooperate with one another by means of guides of a first and second type, and a plurality of spring elements in the form of compression springs are tensioned between the connection parts.

The different types of guides each comprise a plurality of pegs connected to the second connection part, which allow for a movement of the second connection part only along parallel central axes of the pegs relative to the first connection part, wherein the pegs to be assigned to the guide of the first type each have a stop contour that acts in the pull-out direction, which points away from the first connection part, i.e., a contour of the first connection part that engages behind and prevents the second connection part from being completely removed from the first connection part. In contrast to those pegs which represent components of the guide of the first type, the pegs to be assigned to the guide of the second type are each surrounded by one of the spring elements mentioned.

There is thus a clear separation of functions that are taken over by the various guides, wherein at least one of the two guides, in particular exactly one of the two guides, namely the guide of the first type, is designed as a linear slide bearing with guide shafts as pegs. As an additional function, in the case of the first guide there is a stop function and in the case of the second guide the spring force repelling the connection parts relative to one another. The second guide is not necessarily designed as a linear bearing. For example, the function of the pegs of the second guide can lie solely in supporting the spring elements. Thanks to the exact, non-rotatable linear bearing, which is achieved with the help of the guide shafts, a low spring force of the spring elements is already sufficient for the desired functionality of the impact-protection safety device, whereby after it has responded, i.e., after a collision-related compression of the spring elements, a return to the starting position, i.e., in the maximum relaxed state of the spring elements, is effected solely by spring force, or depending on the orientation of the safety device, also by weight.

In an advantageous, particularly slim design of the impact-protection safety device, which is particularly suitable for industrial robots, the central axes of all pegs lie in a common plane, which means that the pegs are arranged in a single straight row, wherein the pegs to be assigned to the guide of the first type are arranged between those pegs which are to be assigned to the guide of the second type.

In this case, for example, the guide of the first type, likewise the guide of the second type, has exactly two pegs, wherein a fastening contour on the first connection part, which is intended to be connected to a counter-contour of a robot arm, is arranged between the two pegs which are to be assigned to the guide of the first type.

To fasten the first connection part, which is also referred to as the base body of the impact-protection safety device, on a robot arm, the fastening contour present on the first connection part can comprise a mounting flange, which is spaced at a smaller distance from the second connection part than the contour of the first connection part cooperating with the stop contour of the peg. The particularly small distance between the attachment contour and the second, movable connection part that is provided in this way ensures particularly good stability of the entire safety device, particularly in the case of tilting loads that act on the second connection part via an actuator attached to this connection part.

That side of the first connection part on which the mounting flange is located is defined as the top without restricting the generality. Compared to the first connection part, the second connection part typically has a less complex, flatter, more cuboid-like shape, wherein an upper edge of this cuboid is aligned parallel to a lower edge of the first connection part. The so-called upper edge of the second connection part is defined as the edge of the second connection part that is the smallest distance from the first connection part, regardless of the actual orientation of the impact-protection safety device in space. The second connection part is also referred to as the actuator flange or connection part of the impact-protection safety device.

According to one possible embodiment, the pegs to be assigned to the guide of the second type are shorter than the spring elements and shorter than the pegs to be assigned to the guide of the first type, and are spaced completely from the first connection part in the maximum elevated position of the second connection part from the first connection part, i.e., pulled out from the first connection part. This has the advantage that in the basic position of the impact-protection safety device, i.e., when the second connection part is maximally elevated from the first connection part, the fully extended state of the pegs of the guide of the second type can be visually recognized in the simplest way. The pegs to be assigned to the guide of the second type only perform their task of acting as components of a linear guide between the two connection parts when the second connection part has already been partially displaced in the direction of the first connection part against the force of the spring elements. Only with a further displacement of the second connection part and thus increasing spring forces can the pegs of the guide of the second type act as linear guide components in addition to the pegs which are to be assigned to the guide of the first type. It is also possible to implement configurations in which the pegs, which are to be assigned to the guide of the second type, serve exclusively to support the springs and, moreover, optionally have a stop function when the connection parts are pushed together.

If the second connection part is displaced maximally in the direction of the first connection part, a stop can be provided in that the main components of the two connection parts, referred to as connection blocks, strike one another. If, on the other hand, the displacement path of the second connection part is limited by the fact that the pegs that are part of the guide of the second type are stopped in a defined manner in blind holes that are located in the first connection part and represent contours of the guide of the second type, then a distance remains between the lower edge of the first connection part and the upper edge of the second connection part, even when the connection parts are pushed together to the maximum extent.

Optionally, the impact-protection safety device includes a hood that covers the first connection part and can be fastened to it, wherein said hood can have a closed cover surface on its side facing away from the second connection part. The closed design of the cover surface means that no space has to be kept free for the robot arm at the corresponding point and is particularly effective for dust protection. The hood, that is to say the housing cover, can be fastened without tools to the first connection part, for example by means of a snap connection, i.e., by a clip-on connection.

In a particularly production-friendly manner, especially when only producing small quantities, it is possible to produce either the first connection part or the second connection part or both connection parts and/or the hood as a 3D printed part, i.e., to manufacture it additively. In principle, metallic materials as well as non-metallic materials are suitable for the production of the connection parts in 3D printing, wherein the connection parts can also be additively manufactured from a combination of metallic and non-metallic materials. In the case of the production of at least one connection part from plastic, this is, for example, produced by 3D printing based on a continuous fiber-reinforced core. In particular, carbon fibers can be considered for reinforcing the connection part. When both connection parts are made of plastic, it has proven useful if the pegs to be assigned to the guide of the first type are each guided in at least one recirculating ball bushing. It has also proven useful if at least one of the connection parts is made of aluminum and the pegs to be assigned to the guide of the first type are each guided in at least one recirculating ball bushing. It is particularly preferred if both connection parts are made of aluminum.

The provision of recirculating ball bushings enables a particularly precise guidance of the pegs to be assigned to the guide of the first type and reliably prevents tilting of the first connection part in relation to the second connection part.

In order to detect the relative positioning of the two connection parts, a position sensor can be provided, which can be integrated into an actuator sensor box. This box, which in addition to the position sensors can include electrical and/or fluid-technical, i.e., pneumatic or hydraulic, components, can be attached to the first connection part or built into it. The position sensor can be used in particular to detect whether the second connection part has returned to its initial position after it has completed a compensating movement due to an overload, i.e., has been pushed in the direction of the first connection part against the spring force. In a typical embodiment, the return to the starting position takes place without pneumatic support.

Irrespective of the configuration or the presence of an actuator-sensor box, pneumatic or hydraulic connections can be located on both connection parts. In particular, on the first connection part there can be clamping brackets for lines, i.e., electrical lines and/or fluid-technical hoses, wherein these clamping brackets can be formed in one piece with the components of the guides of any type formed by the first connection part, in a manner that is particularly advantageous in terms of production technology, especially in the case of additive manufacturing of the first connection part, including that contour which cooperates with the stop contours of the pegs.

BRIEF DESCRIPTION OF THE DRAWINGS

In the following, an exemplary embodiment of the disclosure is explained in more detail by means of a drawing. In the figures.

DETAILED DESCRIPTION

Figure 1:
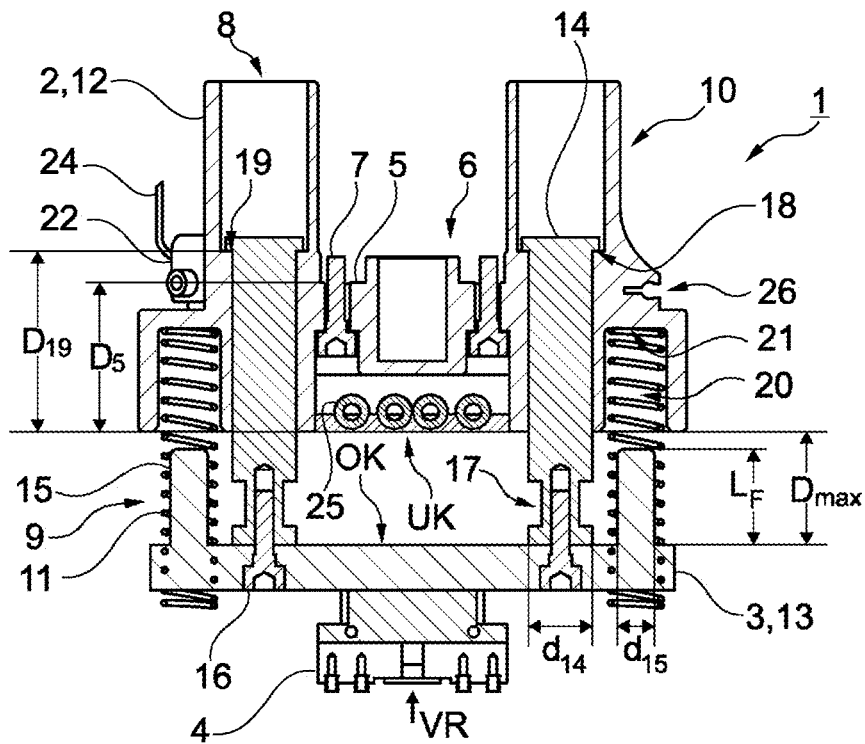
FIG. 1 shows an impact-protection safety device in a simplified sectional view.
Figure 2:
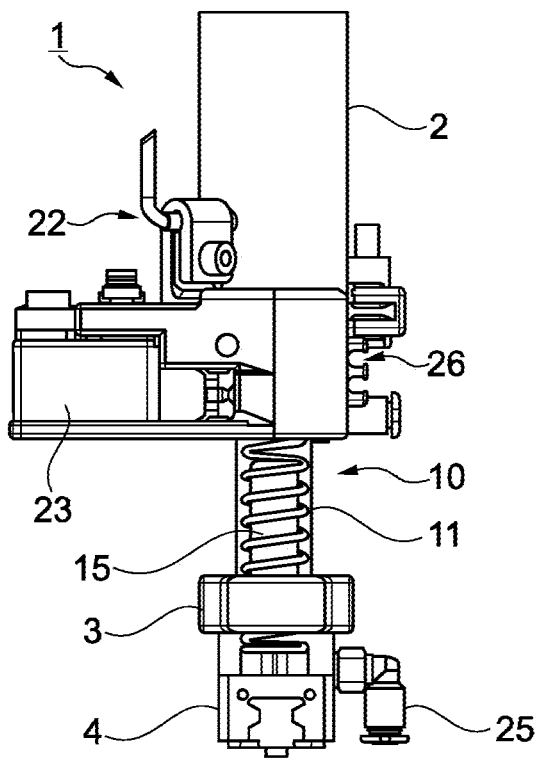
FIG. 2 shows the safety device in a side view.
Figure 3:
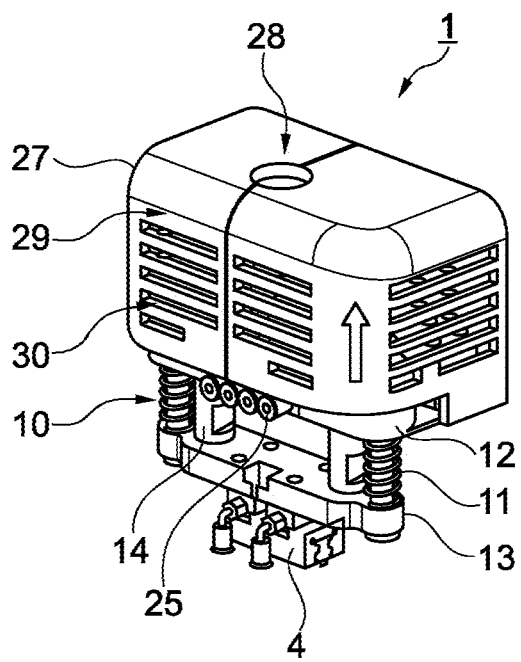
FIG. 3 shows the safety device including a hood in a perspective view.

An impact-protection safety device, identified as a whole by the reference numeral 1, is provided for use in an industrial robot. With regard to the basic function of the safety device 1, reference is made to the prior art cited at the outset.

The impact-protection safety device 1 is made up of two connection parts 2, 3, namely a first connection part 2, also referred to as a base body, which is to be connected to an arm of the robot, and a second connection part 3, which is to be connected to an end effector of the robot. In the exemplary embodiment, there is an end effector in the form of an actuator 4 which is firmly connected to the second connection part 3.

A fixed geometric relationship between the connection parts 2, 3 results during regular operation of the robot. A safety function of the device 1 is that the second connection part 3 can be displaced against spring force in the direction of the first connection part 2 when high impact forces act on this part 3. The corresponding direction of displacement is denoted by VR. Since the displacement direction VR is defined as the z-direction, the entire impact-protection safety device 1 is also referred to as the z-compensation module. Movement of the second connection part 3 relative to the first connection part 2 is only possible in the displacement direction VR and in the opposite direction thereto, wherein tilting of the second connection part 3 relative to the first connection part 2 is reliably prevented. A mounting flange 5 of the first connection part 2 lies in a plane which—based on a Cartesian coordinate system—is parallel to the associated xy plane. The mounting flange 5 is to be assigned to a fastening contour, which is denoted overall by 6, of the first connection part 2. Fastening screws for screwing the first connection part 2 onto the robot arm are denoted by 7.

The linear, mechanically tensioned mobility of the second connection part 3 relative to the first connection part 2 is brought about by a guide 8 of the first type and a guide 9 of the second type. In this case, the guide 8 of the first type acts in the same displacement path as the second connection part 3. Spring elements 11, which are compression springs in the form of helical springs, are also to be assigned to the guide device, which is denoted overall by 10 and comprises the different types of guides 8, 9. The spring elements 11 tension the two connection parts 2, 3 against one another in such a way that a maximum distance $D_{max}$ between the connection parts 2, 3 can be established. The maximum distance $D_{max}$ is to be measured between a lower edge UK of a connection block 12 of the first connection part 2 and an upper edge OK of a connection block 13 of the second connection part 3. The displacement path by which the second connection part 3 can be displaced in relation to the first connection part 2 corresponds to the maximum distance $D_{max}$.

Both connection blocks 12, 13, which represent the main components of the connection parts 2, 3, are 3D printed parts made of aluminum.

The second connection part 3 comprises, in addition to the connection block 13, two pegs 14, 15, which are to be assigned to the guide 8 of the first type or the guide 9 of the second type. Screws with which the pegs 14 are fastened to the connection block 13 are denoted by 16, and dihedral contours of the pegs 14 are denoted by 17. The two pegs 14, which are also referred to as guide shafts, dip into the first connection part 2 in every state of the safety device 1 and ensure that the two connection parts 2, 3 can never be rotated against one another. Stop contours 18 at the end of each peg 14 prevent the peg 14 from being pulled out of the connection block 12. The stop contours 18 are undercuts which engage behind contours, which are denoted by 19, of the first connection part 2. Based on the arrangement according to FIG. 1, the pegs 14 can thus only be inserted into the connection block 12 from above. The diameter of each peg 14 is denoted by $d_{14}$. Preferably, the first connection part 2 in the region of the guide for the pegs 14 comprises at least one recirculating ball bushing (not shown here), as a result of which the precision of the guide for the pegs 14 can be increased.

The two pegs 14 are arranged between the pegs 15, which are to be assigned to the guide 9 of the second type and each have a diameter $d_{15}$. The central axes of all pegs 14, 15 lie in a common plane parallel to the yz plane. In the exemplary embodiment, a free length $L_F$ by which the pegs 15 protrude from the connection block 13 is less than the maximum distance $D_{max}$ between the upper edge OK of the connection block 13 and the lower edge UK of the connection block 12.

Each peg 15 is surrounded by one of the spring elements 11, which at the same time engages in a recess 20, which is formed by the connection block 12, and strikes the base 21 of the recess. In the maximum pulled-out state of the second connection part 3 shown in the figures, the pegs 15 hold the spring elements 11 in position. The depth of the recesses 20 is slightly greater than the free length $L_F$ of the pegs 15 so that they cannot hit the base 21 of the recess. Rather, when the connection part 3 is pushed in to the maximum extent, the upper edge OK of the connection block 13 rests against the lower edge UK of the connection block 12.

The distance to be measured in the z-direction, i.e., the feed direction VR, between the lower edge UK of the connection block 12 and the upper side of the mounting flange 5 is denoted by $D_5$ and is less than the distance, denoted by $D_{19}$, between the contour 19 on the connection block 12, which allows for the stopping of the peg 14—more precisely, the stop contours 19—and the lower edge UK. The designations "OK" and "UK" relate to the orientation of the safety device 1 shown in the figures, in which the z-direction corresponds to the vertical direction. The arrangement of the contours 19 above the mounting flange 5 provides a long guide path for the pegs 14 within the connection block 12, while also act to minimize the distance $D_5$ between the mounting flange 5 and the lower edge UK in order to limit any tilting moments that may occur on the connection part 2.

A sensor 22 is intended to detect the relative positioning of the connection parts 2, 3, which is attached to the connection block 12 and cooperates with an actuator-sensor box 23, which can also be assigned to the first connection part 2. An electrical line connected to the sensor 22, that is to say the position sensor, is denoted by 24. The impact-protection safety device 1, including the sensor 22, is designed in such a way that it can come into action during operation in the form of the connection part 3 not being used to press in over the full displacement path against the connection part 2, which means that the spring elements 11 are partially compressed without "moving into the spring" in order to affect the function of the actuator 4 or to stop the robot. The second connection part 3 is not twisted or tilted relative to the first connection part 2 in any operating state.

Pneumatic connections 25 can also be seen on both connection parts 2. In addition, there are clamps 26 on the first connection part 2, which are formed directly by the connection block 12 made of plastic. The clamping brackets 26 can be used to hold pneumatic hoses or cables, which are not shown.

The impact-protection safety device 1 is completed by a hood 27 which is designed in multiple parts and placed on the first connection part 2. A closed cover surface of the hood 27 is designated as 28. Side surfaces 29 of the hood 27 have slots 30 in the exemplary embodiment. The hood 27 can be placed on the first connection part 2 and removed from it without tools. The hood 27 is preferably made of plastic and is formed using a 3D printing process.

LIST OF REFERENCE SYMBOLS

1 Impact-protection safety device
2 First connection part
3 Second connection part
4 Actuator
5 Mounting flange
6 Fastening contour
7 Screw
8 Guide of the first type
9 Guide of the second type
10 Guide device
11 Spring element
12 First connection block
13 Second connection block
14 Peg
15 Peg
16 Screw
17 Dihedral contour
18 Stop contour of the peg 14
19 Contour on the first connection part, cooperating with the stop contour 18
20 Recess
21 Recess base
22 Position sensor
23 Actuator sensor box
24 Electrical line
25 Pneumatic connection
26 Clamping bracket
27 Hood
28 Cover surface
29 Side face
30 Slot
$D_{max}$ maximum distance
$D_5$ distance between the mounting flange 5 and the lower edge
$d_{14}$ diameter of a peg 14
$d_{15}$ diameter of a peg 15
$D_{19}$ distance between the contour 19 and the lower edge
$L_F$ free length
OK upper edge
UK lower edge
VR displacement direction

The invention claimed is:

1. An impact-protection safety device for robots, comprising:
a first connection part configured to be connected to a robot arm;
a second connection part configured to be connected to an actuator;
guides of a first and second type, and a plurality of spring elements tensioned between the connection parts;
wherein the guides each comprise a plurality of pegs connected to the second connection part which allow for a movement of the second connection part only along parallel central axes of the pegs relative to the first connection part, wherein the plurality of pegs of the guide of the first type each have a stop contour that acts in a pull-out direction away from the first connection part, and engages behind a contour of the first connection part, and wherein the plurality of pegs of the guide of the second type are each surrounded by one of the plurality of spring elements;
wherein central axes of the plurality of pegs of the guide of the first type and the plurality of pegs of the guide of the second type lie in a common plane, wherein the plurality of pegs of the guide of the first type are arranged between the plurality of pegs of the guide of the second type.

2. The safety device according to claim 1, wherein the guide of the first type and the guide of the second type each have exactly two pegs, and wherein a fastening contour on the first connection part configured to be connected to a counter-contour of a robot arm is arranged between the two pegs of the guide of the first type.

3. The safety device according to claim 2, wherein the fastening contour present on the first connection part comprises a mounting flange which is spaced at a smaller distance from the second connection part than the contour of the first connection part cooperating with the stop contour.

4. The safety device according to claim 1, wherein the plurality of pegs of the guide of the second type are shorter than the plurality of spring elements and shorter than the plurality of pegs of the guide of the first type and are spaced completely apart from the first connection part in a maximum elevated position of the second connection part from the first connection part.

5. The safety device according to claim 1, further comprising a hood which covers and is held on the first connection part and has a closed cover surface on a side facing away from the second connection part.

6. The safety device according to claim 5, wherein at least one of the first connection part, second connection part, or the hood is a 3D printed part.

7. The safety device according to claim 6, wherein the 3D printed part is made of plastic having a continuous fiber-reinforced core.

8. The safety device according to claim 1, wherein at least one of the first connection part or the second connection part is made of aluminum.

9. The safety device according to claim 8, wherein both of the first connection part and second connection part are made of aluminum.

10. The safety device according to claim 1, further comprising a position sensor for detecting a relative positioning of the first connection part and the second connection part.

11. An impact-protection safety device for robots, comprising:
a first connection part configured to be connected to a robot arm;
a second connection part configured to be connected to an actuator;
guides of a first and second type, and a plurality of spring elements tensioned between the connection parts;
wherein the guides each comprise a plurality of pegs connected to the second connection part which allow for a movement of the second connection part only along parallel central axes of the pegs relative to the first connection part, wherein the plurality of pegs of the guide of the first type each have a stop contour that acts in a pull-out direction away from the first connection part, and engages behind a contour of the first connection part, and wherein the plurality of pegs of the guide of the second type are each surrounded by one of the plurality of spring elements; and pneumatic connections on both of the first connection part and the second connection part, and a plurality of clamping brackets for pneumatic hoses on the first connection part, wherein the clamping brackets are integral and in one piece with the first connection part.

12. An impact-protection safety device for robots, comprising:

a first connection part configured to be connected to a robot arm, the first connection part having a guide of a first type;

a second connection part configured to be connected to an actuator, the second connection part having a guide of a second type; and a plurality of spring elements tensioned between the connection parts, wherein the guides each comprise a plurality of pegs fixed to the second connection part and slidingly received in the first connection part which allow for a movement of the second connection part only along parallel central axes of the pegs relative to the first connection part;

wherein the plurality of pegs of the guide of the first type each have a stop contour facing a pull-out direction away from the first connection part that engages behind a contour of the first connection part, and wherein the plurality of pegs of the second type are each surrounded by one of the spring elements.

13. The safety device according to claim 12, wherein central axes of the plurality of pegs of the guide of the first type and the plurality of pegs of the guide of the second type lie in a common plane, wherein the plurality of pegs of the guide of the first type are arranged between the plurality of pegs of the guide of the second type.

14. The safety device according to claim 13, wherein the guide of the first type and the guide of the second type each have exactly two pegs, and wherein a fastening contour on the first connection part configured to be connected to a counter-contour of a robot arm is arranged between the two pegs of the guide of the first type.

15. The safety device according to claim 14, wherein the fastening contour on the first connection part comprises a mounting flange which is spaced at a smaller distance from the second connection part than the contour of the first connection part cooperating with the stop contour.

16. The safety device according to claim 12, wherein the plurality of pegs of the guide of the second type are shorter than the plurality of spring elements and shorter than the plurality of pegs of the guide of the first type and are spaced completely apart from the first connection part in a maximum elevated position of the second connection part from the first connection part.

17. The safety device according to claim 12, further comprising a hood covering the first connection part having a closed cover surface on a side facing away from the second connection part.

18. The safety device according to claim 17, wherein at least one of the first connection part, second connection part, or the hood is a 3D printed part.

19. The safety device according to claim 18, wherein the 3D printed part is made of plastic having a continuous fiber-reinforced core.

* * * * *